US006879928B2

(12) United States Patent
Clabes et al.

(10) Patent No.: US 6,879,928 B2
(45) Date of Patent: Apr. 12, 2005

(54) METHOD AND APPARATUS TO DYNAMICALLY RECALIBRATE VLSI CHIP THERMAL SENSORS THROUGH SOFTWARE CONTROL

(75) Inventors: Joachim Gerhard Clabes, Austin, TX (US); Lawrence Joseph Powell, Jr., Round Rock, TX (US); Daniel Lawrence Stasiak, Rochester, MN (US); Michael Fan Wang, Austin, TX (US); Balaram Sinharoy, Poughkeepsie, NY (US); Michael Stephen Floyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 10/346,295

(22) Filed: Jan. 16, 2003

(65) Prior Publication Data

US 2004/0143410 A1 Jul. 22, 2004

(51) Int. Cl.[7] .............................................. G01K 11/22
(52) U.S. Cl. ......................... 702/130; 374/117; 331/57
(58) Field of Search ............................ 702/85, 89, 104, 702/130, 132–136, 189; 374/1, 2, 170–171, 117; 331/57, 66

(56) References Cited

U.S. PATENT DOCUMENTS 5,798,667 A * 8/1998 Herbert ....................... 327/573
5,963,103 A * 10/1999 Blodgett ...................... 331/75
6,157,244 A * 12/2000 Lee et al. .................... 327/539
6,160,305 A * 12/2000 Sanchez ...................... 257/656
6,166,586 A * 12/2000 Sanchez et al. ............. 327/538
6,476,682 B1 * 11/2002 Cole et al. ................... 331/176
6,695,475 B1 * 2/2004 Yin ............................. 374/171

OTHER PUBLICATIONS

Lopez–Buedo et al., "Thermal Testing on Programmable Logic Device", Jun. 1998, Circuits and System, 1998, vol. 2, pp. 240–243.*

Wan et al., "Temperature Dependence Modeling for MOS VLSI Circuit Simulation", Oct. 1989, Computer–Aided Design of Integrated Circuits and System, vol. 8 issue 10, pp. 1065–0173.*

* cited by examiner

*Primary Examiner*—Marc S. Hoff
*Assistant Examiner*—Mary Catherine Baran
(74) *Attorney, Agent, or Firm*—Carr LLP; Robert M. Carwell

(57) ABSTRACT

The present invention provides an integrated circuit VLSI temperature system for the calibration of threshold temperatures. A temperature sensitive ring oscillator (TSRO) generates a TSRO calibration parameter. A memory is employable to store the TSRO calibration parameter. A module is employable to determine a threshold TSRO oscillation frequency from the TSRO calibration parameter. A memory is employable for storing at least one threshold TSRO oscillation frequency.

20 Claims, 2 Drawing Sheets

US 6,879,928 B2

METHOD AND APPARATUS TO DYNAMICALLY RECALIBRATE VLSI CHIP THERMAL SENSORS THROUGH SOFTWARE CONTROL

TECHNICAL FIELD

The invention relates generally to thermal sensing and, more particularly, to calibrating a thermal sensor in an integrated circuit.

BACKGROUND

Transistors can be used as logical switches in an integrated circuit (IC). Transistors generate heat when switching from an off state to an on state, or from an on state to an off state, within the IC. If this heat is neither properly dissipated nor otherwise accounted or compensated for, the transistor can experience degeneration leading to transistor failure.

However, although the IC can have an associated temperature sensor to detect excessive heat, there can be significant variation in the readings obtained from a temperature sensor from IC to IC. Therefore, a calibration of the temperature sensor for a given IC is performed to compensate for this variation. Conventionally, one method of calibration is to generate an overall temperature for the IC chip environment, and then calibrate the temperature sensor or temperature sensors at that temperature. In other words, determine what the readings of the temperature sensors are at a known temperature, and use these readings as a basis for comparison when determining an unknown temperature. However, calibration of temperature sensors can be time intensive and costly.

Furthermore, for some forms of error detections as indicated by anomalous IC temperature conditions, a plurality of temperature calibrations are performed at different temperatures. These different temperatures can be "critical" (threshold) temperatures. Generally, when the IC chip reaches a given critical temperature, certain actions are performed or modified by the IC. These actions can be the slowing of the processor speed of the IC, disabling certain functionalities within the IC, deactivating the IC itself, and so on.

However, there are problems with conventional critical temperature calibration procedures. One disadvantage is that the calibrations are performed at fixed temperatures. In other words, typically there is no flexibility in conventional critical temperature calibration systems for setting the critical temperature of the ICs to other than the values that are hard-wired into the IC. Furthermore, heating the chip to the various critical temperatures can be a time and labor intensive process.

Therefore, what is needed is a way to calibrate for critical temperatures of an IC chip that solves at least some of the disadvantages associated with conventional calibrations of critical temperatures of IC chips.

SUMMARY OF THE INVENTION

The present invention provides an integrated circuit (IC) temperature system for calibration of threshold temperatures. A temperature sensitive ring oscillator (TSRO) generates a TSRO calibration parameter from a calibration temperature. A memory is employable to store the TSRO calibration parameter. An operating module is employable to determine a threshold TSRO oscillation frequency from the TSRO calibration parameter. A memory is employable for storing a threshold TSRO oscillation frequency.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
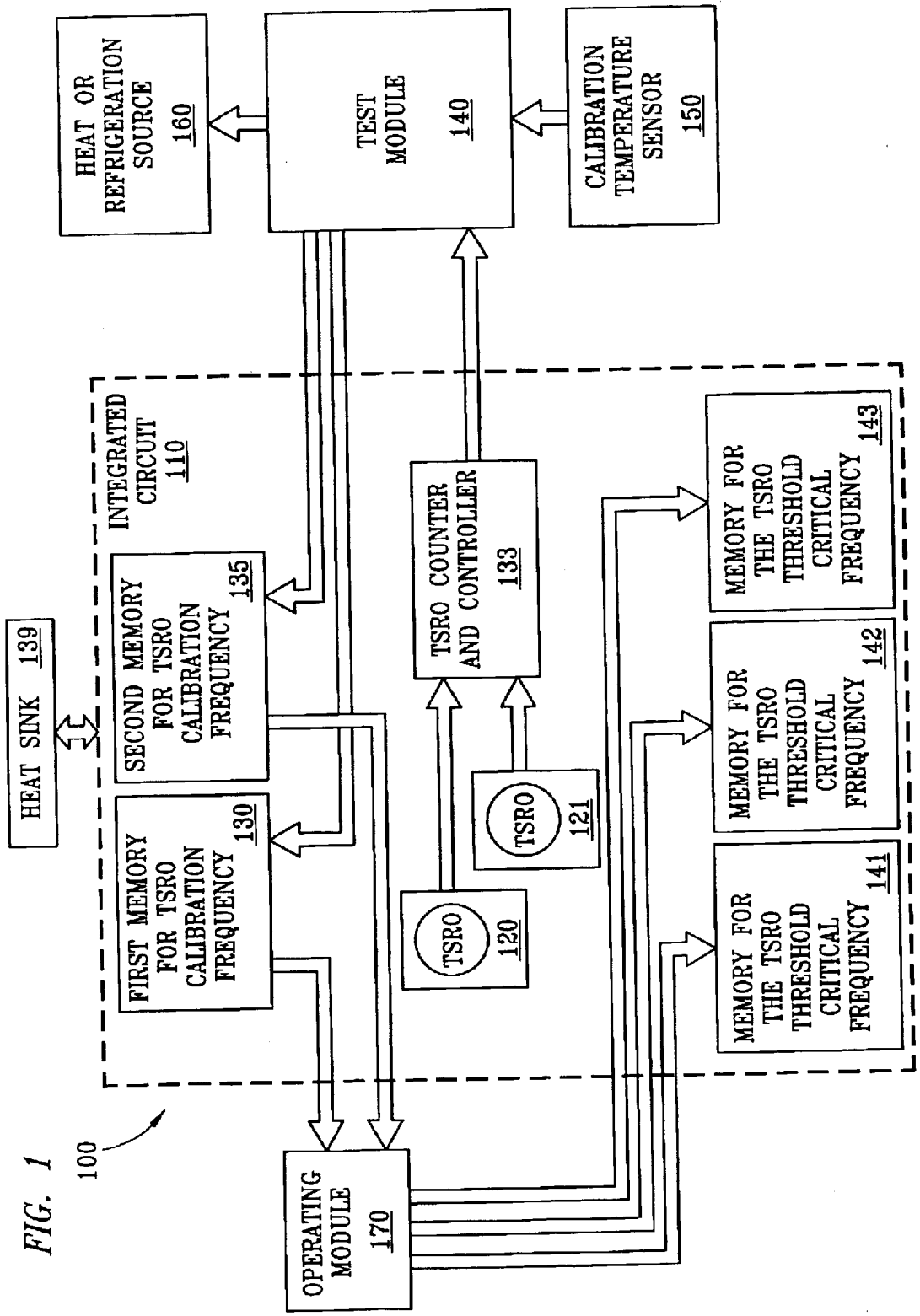
FIG. 1 schematically depicts an integrated circuit comprising a TSRO, two calibration value memories, and three threshold value memories.

Turning to FIG. 1, disclosed is an IC critical (threshold) temperature calibration system 100. The system 100 has an integrated circuit (IC) 110. The IC 110 can be a very large scale integrated (VLSI) circuit. The IC 110 has a temperature sensitive ring oscillator (TSRO) 120. Generally, a ring oscillator consists of a number of gain stages in a feedback loop. With the correct configuration, phase shift, and so on, the output of a ring oscillator oscillates at a certain frequency, determined by the ring oscillator components. A TSRO further employs a temperature sensitive element to affect the characteristics of the oscillation, such as number of oscillation cycles per second. Indicia of these oscillations are forwarded to a TSRO counter and controller 133. Generally, the controller 133 monitors and regulates TSROs and converts the frequency indicia of the TSROs into an equivalent indicia employable by other devices.

In FIG. 1, the TSRO 120 oscillates at a first frequency for a first calibration temperature. The first calibration temperature is measured by a temperature sensor 150 employed by a test module 140. Indicia of the corresponding first calibration oscillation frequency value from the TSRO 120 as converted by the controller 133 is conveyed to a test module 140. From the test module 140, the first calibration oscillation frequency value is then conveyed to a first memory 130. The first memory 130 is coupled to or within the IC 110. In one embodiment, the first calibration temperature is a critical temperature. In another embodiment, the first calibration temperature is the measured temperature of the environment of the IC 110 by the temperature sensor 150, without the introduction of specific heating or cooling to the IC 110 at a critical temperature. In another embodiment, additional heat transfer to or from the IC 110 occurs from a heat or refrigeration source 160 when measuring the first calibration temperature, the first calibration temperature being either substantially a minimum or maximum temperature value for operating the IC 110, or another temperature in between the minimum and maximum temperatures.

Then, the temperature of the environment of the IC 110 is altered, or the IC 110 otherwise is heated or cooled by the heat or refrigeration source 160 or some other means, through the introduction or removal of heat from the environment of the IC 110, at the instruction of the test module 140. The second calibration temperature is therefore a different temperature value from the first calibration temperature. This second calibration temperature can be a critical temperature of the IC 110. The second calibration temperature can also be a non-critical temperature. Generally, the TSRO 120 oscillates at a second calibration frequency at the second calibration temperature, and indicia of the corresponding second oscillation frequency value from the TSRO 120 is conveyed from the controller 130 to the test module 140, and from there to a second memory 135. In an alternative embodiment, indicia of the first and second calibration values are conveyed to the first and second memories 130, 135 without being first conveyed to the test module 140.

An operating module 170 employs the first and second calibration oscillation values within the memories 130 and 135, correlating to the first and second calibration temperatures as measured by the temperature sensor 150. The operating module 170 determines a plurality of oscillation frequencies of the TSRO 120 correlating to critical threshold temperatures of the IC 110. Those of ordinary skill in the art understand that the operating module 170 can be employed within the IC 110.

In FIG. 1, generally, the operating module 170 employs the first and second calibration frequencies corresponding to the first and second calibration temperatures measured by the temperature sensor 150 to determine the TSRO critical, or threshold, TSRO frequencies. The operating module 170 conveys these critical (that is, threshold) frequencies to the first, second and third threshold memories 141, 142 and 143.

In one embodiment, the operating module 170 can employ a plurality of data sources to determine the critical temperature thresholds for the system 100. For instance, the software can take into account such factors as the size of the heat sink to which the IC 110 is coupled, such as heat sink 139, the power of the fan that is employed to cool the chip, the environment upon which the chip is to be employed (desktop, laptop, etc.), the type of IC 110 and its characteristics, the type of application running on the IC 110, and so on.

In the system 100, the critical oscillation values do not necessarily map to the calibration temperatures measured by the TSRO 120 during the calibrations. Instead, the first and second frequency calibration values are employed as two points in an equation, and the threshold oscillation values can be calculated or interpolated or extrapolated therefrom. The calculation can employ a linear equation, a non-linear equation, or other relationships between the first and second frequency calibration values that can be employed to determine the frequency values for other temperatures.

Furthermore, the threshold temperatures can be dynamically recalculated by the operating module 170. For instance, if the operating module 140 determines that the application running on the IC 110 has changed, new critical temperatures for the various warning thresholds could be recalculated. Then, these new critical temperatures are converted into threshold critical oscillation values and are stored in the first, second and third threshold memories 141, 142 and 143.

Furthermore, the calibration temperature values can be employed for determining the TSRO frequency oscillation values for a plurality of TSROs. For example, in FIG. 1, the oscillations of TSRO 121 can also be compared to TSRO oscillation values to determine if a critical/threshold temperature has been reached.

Figure 2:
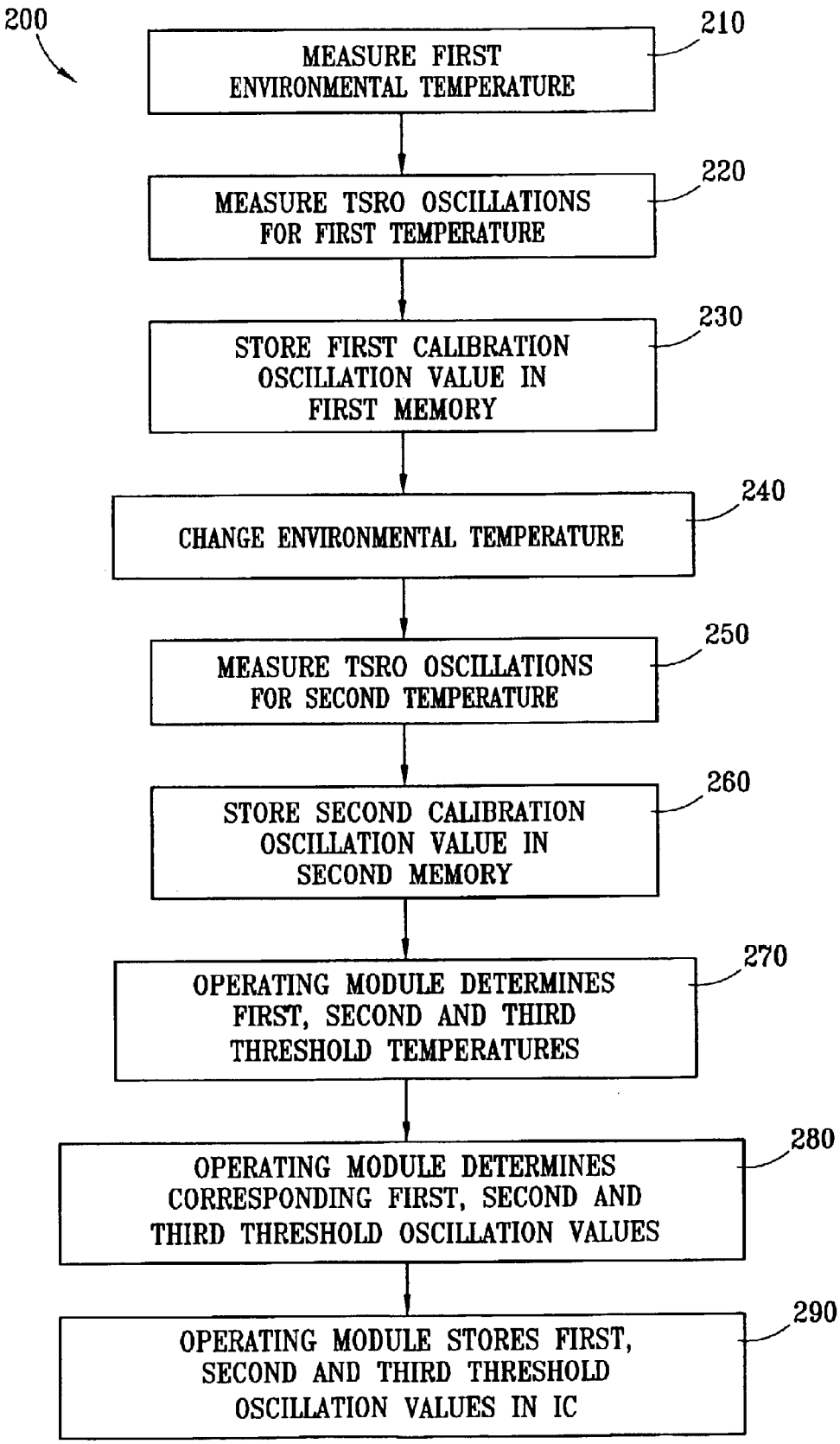
FIG. 2 illustrates a method for determining and storing the TSRO critical, or threshold, oscillation values, correlating to critical temperatures, in an IC chip.

Turning now to FIG. 2, disclosed is a method 200 for storing first, second and third threshold oscillation frequency values, as calculated by the operating module 170, into the first, second and third threshold memories 141, 142 and 143. In step 210, the temperature of the IC 100 is measured by the test module 140. This can be performed with a temperature sensor that is integrated in the IC, or separate from the IC. In step 220, the TSRO 120 oscillates proportional to the first calibration temperature as determined by the test module 140. In step 230, this calibration oscillation value is determined by the controller 133 and is stored in the first memory 130.

In step 240, the environmental temperature is changed, as determined by the test module 140. This change can be to substantially a threshold temperature, a non-threshold temperature, a relative high temperature for the IC 110, a relative low temperature for the IC 110, or other temperature values in between. In step 250, the TSRO 120 generates a second frequency proportional to the second calibration temperature. In step 260, after being processed by the controller 133, the second frequency is stored in the second memory 135.

In step 270, the operating module 170 determines the first, second and third critical, or threshold, temperatures. The first, second and third threshold temperatures can be determined from the type of heat sink to which the IC 110 is coupled, the type of IC 110, the type of application which is running on the IC 110, whether the environment is a laptop or a desktop environment, and so on.

In step 280, the operating module 170 extrapolates, interpolates or otherwise determines the corresponding threshold oscillation values for the threshold temperatures. The operating module 170 employs the first and second oscillation values for the known temperatures, and performs a linear or non-linear interpolation or extrapolation, or some other mathematical derivation, to determine the threshold oscillation values. In step 290, the first, second and third oscillation values are stored in the first, second and third threshold memories 141, 142 and 143.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An integrated circuit (IC) temperature calibration system for threshold temperatures, comprising:
    a temperature sensitive ring oscillator (TSRO) employable to generate a TSRO calibration parameter from a first calibration temperature;
    a memory employable to store indicia of the TSRO calibration parameter;
    an operating module employable to determine at least one threshold TSRO frequency from the TSRO calibration parameter, wherein the operating module is at least configured to numerically calculate threshold oscillation values; and
    a memory employable for storing at least one threshold TSRO frequency.

2. The system of claim 1, wherein a plurality of memories are employable to store a plurality of TSRO calibration parameters.

3. The system of claim 1, further comprising a TSRO having an oscillation output comparable to at least one threshold TSRO frequency.

4. The system of claim 1, wherein the operating module comprises software.

5. The system of claim 1, further comprising a test module employable to generate a temperature.

6. The system of claim 1, wherein the operating module is further employable to determine a threshold temperature.

7. The system of claim 6, wherein the threshold temperature comprises a function of the size of a heat sink coupled to the integrated circuit.

8. The system of claim 6, wherein the threshold temperature comprises a function of the type of integrated circuit.

9. The system of claim 1, further comprising a heat generator employable to alter the first calibration temperature into a second calibration temperature.

10. The system of claim 1, further comprising a temperature sensor employable to measure the first and second calibration temperatures.

11. The system of claim 1, wherein the calibration temperature correlates to a threshold temperature.

12. A method to dynamically calibrate TSROs in an IC, comprising:
    measuring a first calibration temperature;
    measuring a first calibration oscillation value;
    changing the environmental temperature;
    measuring a second calibration temperature;
    measuring a second calibration oscillation value;
    employing the first and second calibration oscillation values to numerically calculate a first threshold oscillation value from a first threshold temperature value; and
    storing the first threshold oscillation value.

13. The method of claim 12, further comprising determining the first threshold temperature value.

14. The method of claim 12, wherein determining the first and second temperature values further comprises employing indicia of the size of a heat sink coupled to the IC.

15. The method of claim 12, further comprising a step of converting a plurality of threshold temperature values to a plurality of threshold oscillation values.

16. The method of claim 12, further comprising transferring indicia of the first and second calibration temperatures to a test module.

17. The method of claim 12, further comprising storing at least three threshold oscillation values into one or more memory locations.

18. A computer program product for dynamically calibrating an IC chip, the computer program product having a medium with a computer program embodied thereon, the computer program comprising:
    computer code for measuring a first calibration temperature;
    computer code for measuring a first calibration oscillation value;
    computer code for changing the environmental temperature;
    computer code for measuring a second calibration temperature;
    computer code for measuring a second calibration oscillation value;
    computer code for employing the first and second calibration oscillation values to numerically calculate a first threshold oscillation value from a first threshold temperature value; and
    computer code for storing the first threshold oscillation value.

19. A processor for dynamically calibrating an IC chip, the processor including a computer program comprising:
    computer code for measuring a first calibration temperature;
    computer code for measuring a first calibration oscillation value;
    computer code for changing the environmental temperature;
    computer code for measuring a second calibration temperature;
    computer code for measuring a second calibration oscillation value;
    computer code for employing the first and second calibration oscillation values to numerically calculate a first threshold oscillation value from a first threshold temperature value; and
    computer code for storing the first threshold oscillation value.

20. The processor of claim 19, further comprising computer code for determining the first threshold temperature value.

* * * * *